Oct. 14, 1969   J. F. SHERWOOD   3,472,479
POWER ACTUATED VALVE WITH MANUALLY ADJUSTABLE MEANS FOR
VOLUME REGULATION AND FOR MANUALLY OPERATING
VALVE WHEN MOTOR POWER IS INOPERATIVE
Filed Feb. 7, 1968   2 Sheets-Sheet 1

INVENTOR.
JOHN F. SHERWOOD
BY
Bertha L. MacGregor
ATTORNEY

Oct. 14, 1969 J. F. SHERWOOD 3,472,479
POWER ACTUATED VALVE WITH MANUALLY ADJUSTABLE MEANS FOR
VOLUME REGULATION AND FOR MANUALLY OPERATING
VALVE WHEN MOTOR POWER IS INOPERATIVE
Filed Feb. 7, 1968 2 Sheets-Sheet 2
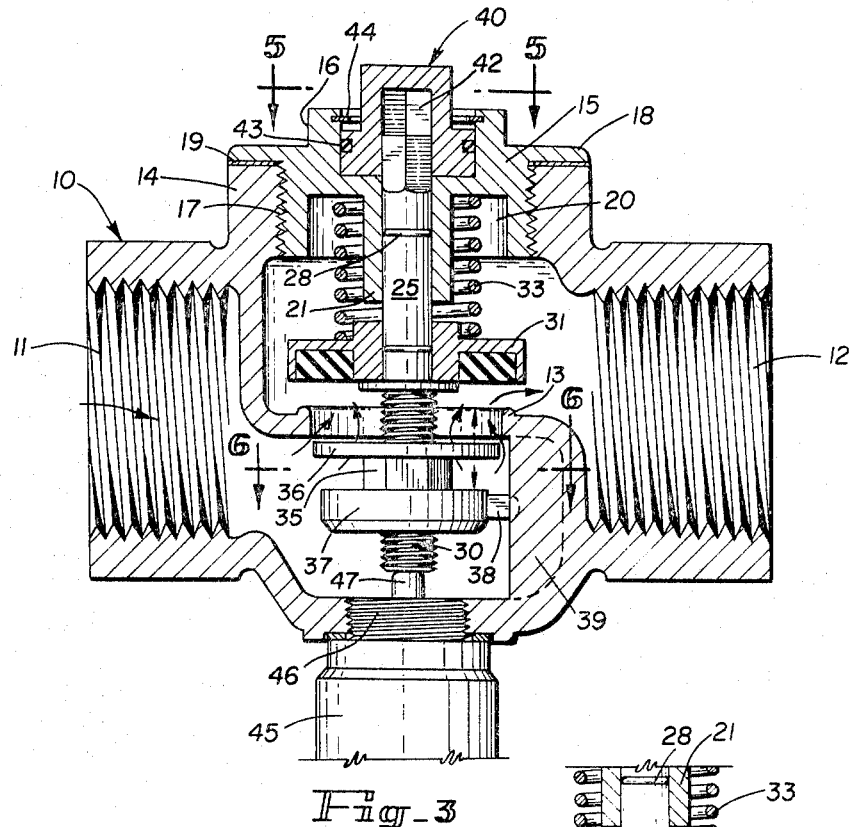
Fig_3
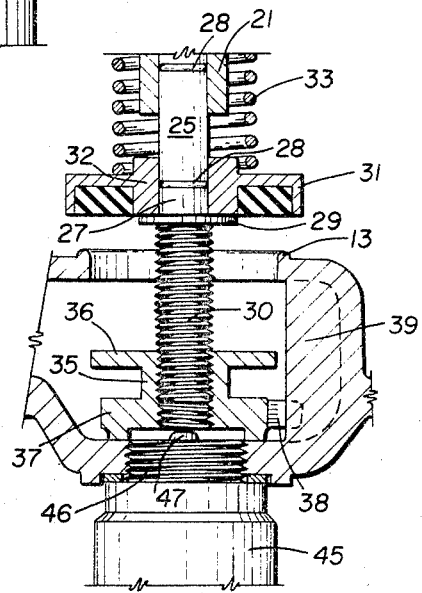
Fig_4
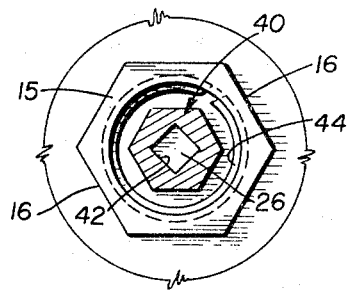
Fig_5
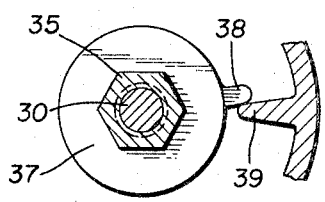
Fig_6
INVENTOR.
JOHN F. SHERWOOD
BY
Bertha L. MacGregor
ATTORNEY

United States Patent Office 3,472,479
Patented Oct. 14, 1969

3,472,479
POWER ACTUATED VALVE WITH MANUALLY ADJUSTABLE MEANS FOR VOLUME REGULATION AND FOR MANUALLY OPERATING VALVE WHEN MOTOR POWER IS INOPERATIVE
John F. Sherwood, Glendora, Calif., assignor to Clemar Manufacturing Corp., Azusa, Calif., a corporation of California
Filed Feb. 7, 1968, Ser. No. 703,691
Int. Cl. F16k *31/14, 1/52*
U.S. Cl. 251—11       10 Claims

ABSTRACT OF THE DISCLOSURE

A power actuated valve with manually adjustable means for regulating volume and for operating the valve manually when the motor power is inoperative. The valve comprises a motor, preferably a thermal motor, a valve housing having a seat therein, a valve stem which has a valve plug fixed thereon between the stem ends, a threaded end portion, a throttle nut movable on the threaded portion, and a manually adjustable nut on the end opposite the threaded end portion for moving the throttle nut on the stem and thus regulating the volume of flow through the valve, and for moving the throttle nut and the valve stem with plug to valve opening position when the motor power is cut off or the motor becomes inoperative for any reason.

---

This invention relates to a valve actuated by a motor, the valve being provided with manually adjustable means for regulating the flow of fluids through the valve and also for operating the valve manually in the event the motor power is cut off or the motor becomes inoperative for any reason.

The valve embodying my invention is provided with a valve stem which has a valve plug fixed thereon between its ends, a threaded end portion, and a throttle nut movable on the threaded portion. The manually adjustable means is a nut mounted on the accessible end of the valve stem for rotating the stem and causing the throttle nut to move relatively to the stem and thus regulate the flow through the valve. In the event of motor failure, manual rotation of the stem by the adjustable nut as described hereinafter causes the throttle nut to move on the stem to a stop position and continued rotation causes the stem to move axially and thus move the plug to open valve position. The manual regulation of the volume of flow through the valve is achieved without interfering with the actuation of the valve stem and plug by the motor shaft.

In the drawings:

FIG. 3 is a view similar to FIG. 1, showing the valve plug in the raised, valve opening position, and showing the throttle nut on the threaded portion of the valve stem after it has been moved thereon by manual adjustment of a nut on the upper end of the valve stem for regulating the flow of fluid through the valve by means of the throttle nut.

FIG. 4 is a fragmentary vertical sectional view of the valve, showing the throttle nut in lowermost position and valve stem raised relatively to the throttle nut, to move valve plug to open position when motor is not operating.

FIG. 5 is a horizontal sectional view in the plane of the line 5—5 of FIG. 3.

FIG. 6 is a horizontal sectional view in the plane of the line 6—6 of FIG. 3.

Figure 1:
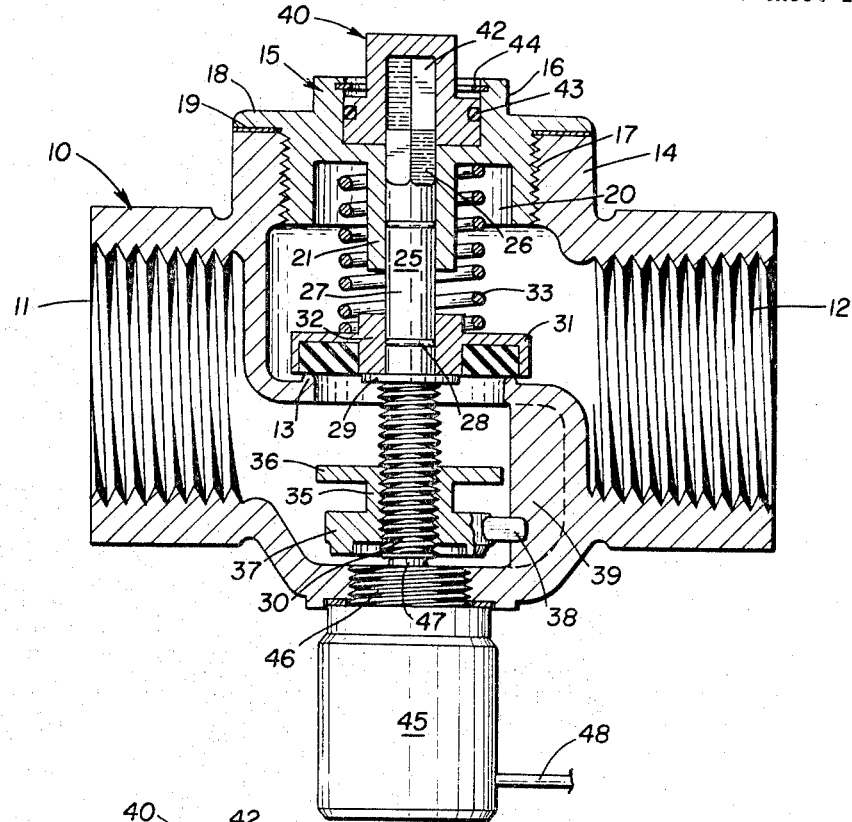
FIG. 1 is a vertical sectional view of a valve embodying my invention, showing the valve plug seated on the valve seat in the housing under influence of a coiled spring bearing on the plug.

In that embodiment of the invention shown in the drawings, 10 indicates the valve housing as a whole, provided with inlet 11 and outlet 12, suitably threaded for connection to fluid conduits (not shown). The housing 10 has formed therein an annular valve seat 13 located in a horizontal plane approximately in alignment with the axis of the inlet 11 and outlet 12. The valve housing 10 has an upper sleeve portion 14 internally threaded to receive a valve cap 15. The cap 15 is externally hexagonal in shape to provide wrench surfaces 16 on its upper portion, and is threaded at 17 for engaging the threads on the sleeve portion 14 of the housing.

The cap 15 has a horizontally extended peripheral portion 18 which overlies the flat top surface of the sleeve portion 14 of the housing, separated by a gasket 19. Radially inwardly of the threaded portion 17, the cap 15 is provided with an annular recess 20 and a depending tubular member 21.

A valve stem 25 is slidably mounted in the tubular member 21 of the cap 15. The stem comprises a square upper end 26, round main body portion 27 with O-ring seals 28, valve plug supporting plate 29, and threaded lower portion 30.

A valve plug 31 is fixedly mounted on the body portion 27 of the valve stem 25, its hub 32 bearing on the supporting plate 29 of the stem. The plug 31 is formed to seat on the valve seat 13 when in lowered, valve closing position. A coiled spring 33 surrounds the tubular member 21 and bears at opposite ends on the cap 15 and plug 31.

A throttle nut 35 is movably mounted on the threaded portion 30 of the valve stem 25. The nut 35 comprises an upper radially extending plate member 36 having a diameter slightly less than the diameter of the valve opening in the seat 13. The nut 35 has a lower radially extending bearing member 37 provided with a radially extending finger 38 for engaging a throttle nut stop 39 formed in the housing 10 beneath the seat 13.

A manually adjustable nut 40 is internally recessed to fit on and engage the square end 26 of the valve stem 25 and to provide a space 42 between the upper end of the valve stem and the inner surface of the top of the nut 40. The nut 40 fits in the upper recessed end of the cap 15 and is provided with an O-ring seal 43. The nut 40 is retained by a retainer ring 44 mounted in the upper portion of the valve cap 15.

A thermal motor 45 has a threaded portion 46 on its housing for mounting the motor in the valve housing 10 so that the end of the motor shaft 47 engages the end of the valve stem 25. The thermal motor may be of the type shown in my U.S. Patents Nos. 3,029,595 and 3,335,-997, in which expansible material is heated by electrical heating elements (not shown) supplied with electrical current through wires 48.

Figure 2:
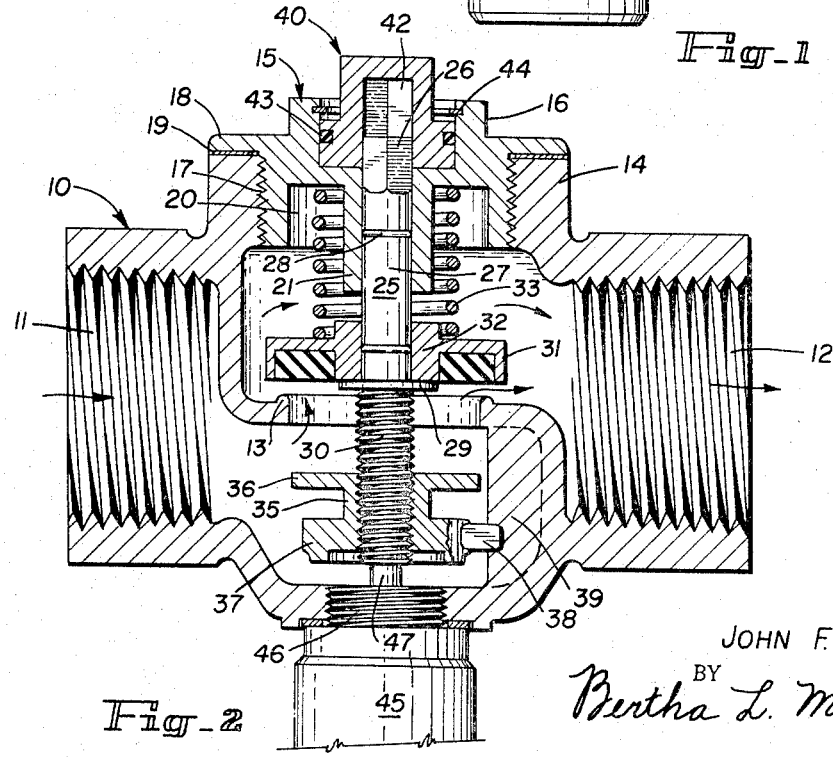
FIG. 2 is a view similar to FIG. 1, showing the valve in open position, the valve stem having been raised by a thermal motor shaft to lift the valve plug off its seat.

The operation of the valve is as follows: Assuming that the expansible material in the thermal motor 45 is cool and the shaft 47 retracted, as shown in FIG. 1, the valve plug 31 will be seated on seat 13 in valve closing position by urging of the coiled spring 33 bearing on the plug. When the expansible material in the motor 45 has become heated, the piston shaft 47 is caused to move outwardly, that is upwardly in the drawings, as shown in FIG. 2, thereby raising the valve stem 25 by bearing against the end of the threaded portion 30. This action raises the entire stem 25, and lifts the plug 31 off its seat, to open the valve.

When it is desired to adjust the flow through the open valve, the nut 40 is turned manually in one direction to cause the finger 38 on the throttle nut 35 to engage the stop 39 in the housing 10. Continued turning of the nut 40, while the throttle nut 35 is prevented from turning by the stop, causes the throttle nut 35 to move upwardly on the threaded portion 30 of the valve stem, into flow regulating position as shown in FIG. 3, where the plate 36 of the nut 35 has partially closed the passage through the valve seat 13. Rotation of the adjusting nut 40 in the opposite direction causes the throttle nut 35 to move downwardly on the threaded portion 30 of the valve stem, thus allowing increased flow through the valve opening.

In the event the motor power is cut off, or the motor fails to work for any reason, the adjusting nut 40 may be rotated to move the throttle nut 35 downwardly on the valve stem as far as possible, into the position shown in FIG. 4. Continued rotation of the nut 40, in the same direction, then causes the throttle nut 35 to remain stationary because it cannot move further downwardly, and to make the valve stem move upwardly, thereby pushing the valve plug up off its seat 13 and allowing fluid to flow through the valve notwithstanding operativeness of the motor.

No damage can occur to the valve stem because there is the space 42 at the upper end within the cap 40 which permits upward movement of the stem 25 by the motor shaft as well as by manipulation of the adjusting nut 40 for moving the valve stem upwardly relatively to the throttle nut 35.

I claim:

1. A power actuated valve provided with manually adjustable means for regulating volume comprising
    (a) a valve housing having an inlet and an outlet and a valve seat and opening between the inlet and outlet,
    (b) a motor having a shaft,
    (c) a valve stem having a threaded end portion actuated by the shaft,
    (d) a valve plug fixed on the stem for moving with the stem to valve opening and closing positions,
    (e) manually operable means on the valve stem for rotating the stem,
    (f) a throttle nut on the threaded portion of the stem, said stem and nut being movable relatively to each other, and
    (g) means in the housing preventing rotation of the throttle nut when the valve stem is manually rotated, whereby rotation of the stem causes the throttle nut to move axially on the stem toward or away from the valve opening to vary the volume of flow through the opening.

2. The valve defined by claim 1, in which the throttle nut includes a radially extending plate which is slightly smaller in diameter than the diameter of the valve opening.

3. The valve defined by claim 1, in which the valve stem has a squared end and the manually operable means is a nut mounted on said squared end and internally spaced therefrom.

4. A power actuated valve provided with manually adjustable means for operating the valve when the motor power is operative, comprising
    (a) a valve housing having an inlet and an outlet and a valve seat and opening between the inlet and outlet,
    (b) a motor having a shaft,
    (c) a valve stem having a threaded end portion actuated by the shaft,
    (d) a valve plug fixed on the stem for moving with the stem to valve opening and closing positions,
    (e) manually operable means on the valve stem for rotating the stem,
    (f) a throttle nut on the threaded portion of the stem, said stem and nut being movable relatively to each other, and
    (g) means in the housing preventing rotation of the throttle nut when the valve stem is manually rotated, whereby rotation of the stem in one direction causes the throttle nut to move axially on the stem away from the valve opening to a non-movable position and further rotation in the same direction causes the stem to move axially relatively to the throttle nut and to move the valve plug into valve opening position without motor power.

5. A power actuated valve provided with manually adjustable means for regulating volume and for operating the valve when the motor power is inoperative, comprising
    (a) a valve housing having an inlet and an outlet and a valve seat and opening between the inlet and outlet,
    (b) a motor having a shaft,
    (c) a valve stem having a threaded end portion actuated by the shaft,
    (d) a valve plug fixed on the stem for moving with the stem to valve opening and closing positions,
    (e) manually operable means on the valve stem for rotating the stem,
    (f) a throttle nut on the threaded portion of the stem, said stem and nut being movable relatively to each other, and
    (g) means in the housing preventing rotation of the throttle nut when the valve stem is manually rotated, whereby rotation of the stem causes the throttle nut to move axially on the stem toward or away from the valve opening to vary the volume of flow through the opening, and whereby rotation of the stem in one direction causes the throttle nut to move axially on the stem away from the valve opening to a non-movable position, and continued rotation in the same direction causes the stem to move axially relatively to the throttle nut and to move the valve plug into valve opening position without motor power.

6. The valve defined by claim 5, in which the throttle nut comprises a hub internally threaded for engagement with the threaded portion of the valve stem, a radially extending plate adapted to vary the flow through the valve opening, and a bearing member adapted to bear against the valve housing to render the throttle nut immovable relatively to the valve stem.

7. The valve defined by claim 5, in which the valve stem has a squared end and the manually operable means is a nut mounted on said squared end.

8. The valve defined by claim 5, in which the valve stem has a squared end and the manually operable means is a nut mounted on said square end with the interior of the head of the nut spaced from the end of said squared end to permit movement in axial direction of the valve stem relatively to the manually operable nut.

9. The valve defined by claim 5, which includes a coiled spring bearing on the valve plug and on the valve housing to urge the plug into valve closing position.

10. The valve defined by claim 5, in which the motor is a thermal motor and the motor shaft is axially aligned with the valve stem for contacting the threaded end of the stem.

References Cited

UNITED STATES PATENTS

| 620,287 | 2/1899 | Donnelly | 251—14 |
| 2,951,499 | 9/1960 | Singer | 251—121 X |

ARNOLD ROSENTHAL, Primary Examiner

U.S. Cl. X.R.

251—121, 130